US011978284B2

(12) United States Patent
Tsuda et al.

(10) Patent No.: US 11,978,284 B2
(45) Date of Patent: May 7, 2024

(54) AUTHENTICATION DATA GENERATION DEVICE, AUTHENTICATION DEVICE, AUTHENTICATION DATA GENERATION METHOD, AND RECORDING MEDIUM

(71) Applicant: NEC Corporation, Tokyo (JP)

(72) Inventors: Shunsuke Tsuda, Tokyo (JP); Hajime Hagimori, Tokyo (JP); Daiki Tanaka, Tokyo (JP); Masaya Tokunaga, Tokyo (JP); Jianquan Liu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/605,651

(22) PCT Filed: Apr. 24, 2020

(86) PCT No.: PCT/JP2020/017656
§ 371 (c)(1),
(2) Date: Oct. 22, 2021

(87) PCT Pub. No.: WO2020/218491
PCT Pub. Date: Oct. 29, 2020

(65) Prior Publication Data
US 2022/0222976 A1 Jul. 14, 2022

(30) Foreign Application Priority Data
Apr. 26, 2019 (JP) ................. 2019-085095

(51) Int. Cl.
G06V 40/70 (2022.01)
G06V 40/12 (2022.01)
(Continued)

(52) U.S. Cl.
CPC .......... G06V 40/70 (2022.01); G06V 40/1365 (2022.01); G06V 40/172 (2022.01);
(Continued)

(58) Field of Classification Search
CPC .... G06V 40/70; G06V 40/67; G06V 40/1365; G06V 40/172; H04N 5/232127;
(Continued)

(56) References Cited

U.S. PATENT DOCUMENTS 8,270,729 B2 * 9/2012 Saijo ................... G06V 40/107
382/214
11,518,382 B2 * 12/2022 Schulter .................. G06N 3/08
(Continued)

FOREIGN PATENT DOCUMENTS

EP 2103255 A2 9/2009
EP 3441910 A2 * 2/2019 ............ G06F 21/32
(Continued)

OTHER PUBLICATIONS

Extended European Search Report for EP Application No. EP20794747.4 dated May 11, 2022.
(Continued)

Primary Examiner — Michael Robert Cammarata

(57) ABSTRACT

A preliminary image is captured that includes parts of an authentication target person. Main authentication targets are determined. The main authentication targets are those parts that each have an acceptable image-capturing state. A single image-capturing device can then be controlled to successively capture images of the main authentication parts of the authentication target person that have been determined with different settings. These images of the main authentication parts that have been captured can then be output. For instance, authentication of the target person may be performed using authentication data for each main authentication part, where such authentication is successfully when authentication for all the main authentication parts is successful.

7 Claims, 11 Drawing Sheets

(51) Int. Cl.
  *G06V 40/16* (2022.01)
  *G06V 40/60* (2022.01)
  *H04N 23/60* (2023.01)
  *H04N 23/611* (2023.01)
  *H04N 23/67* (2023.01)
(52) U.S. Cl.
  CPC ........... *G06V 40/67* (2022.01); *H04N 23/611* (2023.01); *H04N 23/64* (2023.01); *H04N 23/675* (2023.01)
(58) Field of Classification Search
  CPC ........... H04N 5/23219; H04N 5/23222; H04N 23/675; H04N 23/611
  See application file for complete search history.

(56) References Cited

U.S. PATENT DOCUMENTS

| | | |
|---|---|---|
| 2006/0182318 A1 | 8/2006 | Shigeta |
| 2009/0304237 A1 | 12/2009 | Yoshikawa et al. |
| 2010/0085151 A1 | 4/2010 | Hama et al. |
| 2014/0139724 A1* | 5/2014 | Yasuda ................ H04N 23/635 348/349 |
| 2015/0264567 A1 | 9/2015 | Sensharma et al. |
| 2016/0007865 A1* | 1/2016 | Sakata .................. A61B 5/6826 600/480 |
| 2017/0308763 A1* | 10/2017 | Salmelin ............... G06V 40/166 |
| 2018/0165508 A1 | 6/2018 | Othman et al. |
| 2018/0260546 A1* | 9/2018 | Iwata ..................... G06V 10/95 |
| 2019/0087555 A1* | 3/2019 | Lee ........................ G06V 40/16 |
| 2019/0362130 A1* | 11/2019 | Othman ............. G06V 40/1371 |
| 2020/0004940 A1* | 1/2020 | Cho .......................... G06F 9/44 |
| 2022/0043895 A1* | 2/2022 | Nakazaki .............. G06F 18/256 |
| 2022/0222976 A1* | 7/2022 | Tsuda ..................... G06F 21/32 |
| 2022/0363383 A1* | 11/2022 | Tanaka .................. G05D 1/1062 |

FOREIGN PATENT DOCUMENTS

| | | | |
|---|---|---|---|
| EP | 4064119 A1 | * | 9/2022 |
| JP | 2006-221514 A | | 8/2006 |
| JP | 2007141018 A | * | 6/2007 |
| JP | 2007-175250 A | | 7/2007 |
| JP | 2007-233950 A | | 9/2007 |
| JP | 2008-113754 A | | 5/2008 |
| JP | 2010-092121 A | | 4/2010 |
| JP | 2016-076850 A | | 5/2016 |
| JP | 2017-049867 A | | 3/2017 |
| JP | 2017-518549 A | | 7/2017 |
| WO | 2014/155750 A1 | | 10/2014 |
| WO | 2018/151411 A1 | | 8/2018 |

OTHER PUBLICATIONS

International Search Report for PCT Application No. PCT/JP2020/017656, dated Jun. 9, 2020.
JP Office Action for JP Application No. 2021-516249, dated Oct. 4, 2022 with English Translation.
JP Office Action for JP Application No. 2023-067667, mailed on Mar. 26, 2024 with English Translation.

* cited by examiner

1: AUTHENTICATION DEVICE

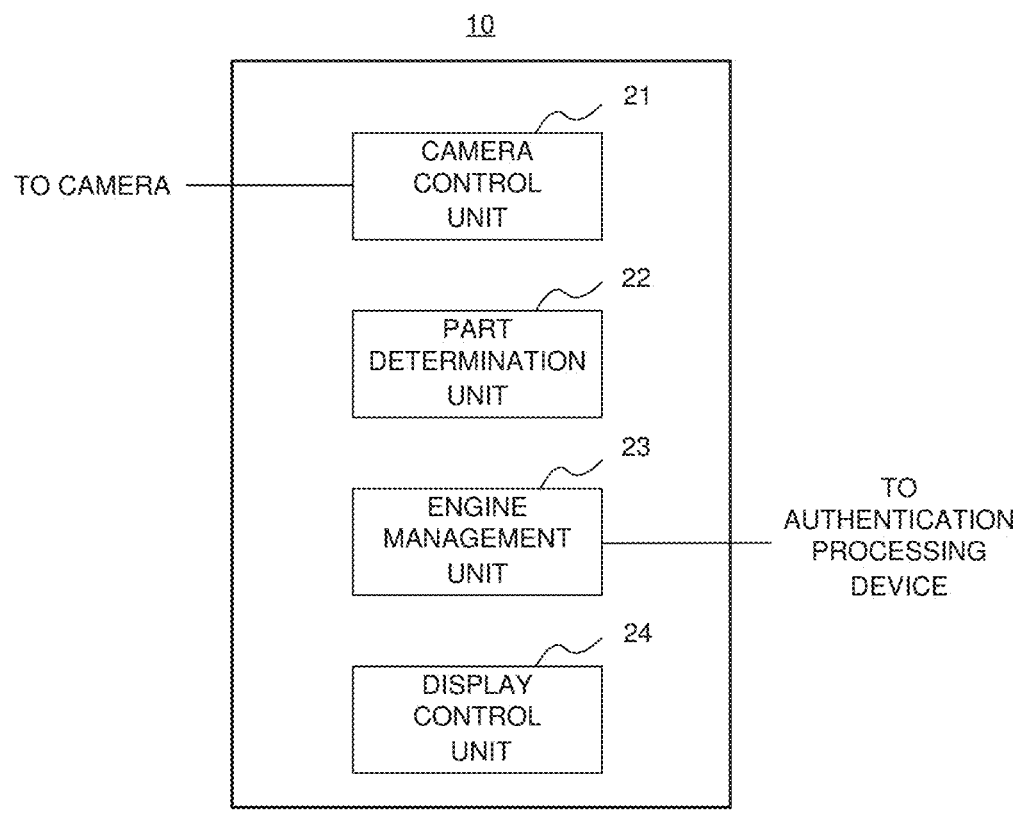

AUTHENTICATION DATA GENERATION DEVICE, AUTHENTICATION DEVICE, AUTHENTICATION DATA GENERATION METHOD, AND RECORDING MEDIUM

This application is a National Stage Entry of PCT/JP2020/017656 filed on Apr. 24, 2020, which claims priority from Japanese Patent Application 2019-085095 filed on Apr. 26, 2019, the contents of all of which are incorporated herein by reference, in their entirety.

TECHNICAL FIELD

The present disclosure relates to biometric authentication.

BACKGROUND ART

There has been proposed a method of authentication using two or more factors. Generally, when the authentication of multiple factors is performed, it is necessary to ask the user to take pictures of different parts or change the pose in order to acquire data of different authentication parts by a camera or a sensor, and therefore the burden of the user increases. In this regard, Patent Document 1 discloses a method of performing two-factor biometric authentication by using images acquired by two image acquisition means.

PRECEDING TECHNICAL REFERENCES

Patent Document

Patent Document 1: Japanese Patent Application Laid-Open under No. 2006-221514
Patent Document 2: Japanese Patent Application Laid-Open under No. 2016-076850

SUMMARY OF INVENTION

Problem to be Solved by the Invention

However, in the technique of Patent Document 1, since it is necessary to prepare an image acquisition means for each factor of biometric authentication, there is such a problem that the device becomes large and complicated.

It is an object of the present disclosure to acquire information of multiple factors with a simple configuration and without burdening the user.

Means for Solving the Problem

According to an example aspect of the present invention, there is provided an authentication data generation device comprising:
an image-taking control unit configured to control a single image-taking device to take images of a plurality of authentication parts of the authentication target person with different settings; and
an output unit configured to output taken images of the plurality of authentication parts obtained by the image-taking as authentication data for the authentication parts.

According to another example aspect of the present invention, there is provided an authentication data generating method comprising:
controlling a single image-taking device to take images of a plurality of authentication parts of the authentication target person with different settings; and
outputting taken images of the plurality of authentication parts obtained by the image-taking as authentication data for the authentication parts.

According to still another example aspect of the present invention, there is provided a recording medium recording a program for causing a computer to execute processing of:
controlling a single image-taking device to take images of a plurality of authentication parts of the authentication target person with different settings; and
outputting taken images of the plurality of authentication parts obtained by the image-taking as authentication data for the authentication parts.

BRIEF DESCRIPTION OF THE DRAWINGS

FIG. 3 is a block diagram showing a functional configuration of the authentication data generation device.

EXAMPLE EMBODIMENTS

Preferred example embodiments of the present disclosure will be described with reference to the accompanying drawings.

1. First Example Embodiment

Figure 1:
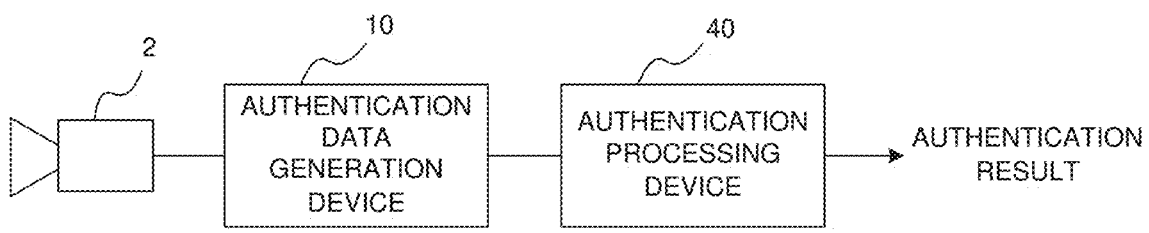
FIG. 1 shows a schematic configuration of an authentication device according to a first example embodiment.

[Overall Configuration]
FIG. 1 shows a schematic configuration of an authentication device according to an example embodiment of the present disclosure. The authentication device 1 is a device that performs biometric authentication of multiple factors, i.e., two or more factors. The authentication device 1 includes a camera 2, an authentication data generation device 10, and an authentication processing device 40. The camera 2 takes images of a user who is the subject of the authentication, and supplies the taken images to the authentication data generation device 10. Specifically, the camera 2 generates the taken images of parts (hereinafter, also referred to as "authentication parts") used for the biometric authentication of the user. For example, when the authentication device 1 performs face authentication and palmprint authentication of the user, the camera 2 generates the taken images including the user's face and palm. The camera 2 is an example of an image-taking device of the present disclosure.

The authentication data generation device 10 has a function of controlling the image-taking by the camera 2, and controls the camera 2 so as to take the image of each authentication part in a setting suitable for each authentication part of the user. For example, when the authentication device 1 performs face authentication and palmprint authentication of the user, the authentication data generation device 10 controls the camera 2 to take the image focused on the user's face and the image focused on the user's palm.

Also, the authentication data generation device 10 acquires the taken images focused on each authentication part from the camera 2, and supplies them to the authentication processing device 40 as the authentication data. In the above-described example, the authentication data generation device 10 supplies the image focused on the user's face and the image focused on the user's palm to the authentication processing device 40 as the authentication data. The authentication processing device 40 includes a plurality of authentication engines prepared for each authentication part, and the authentication data generation device 10 supplies the taken image focused on each authentication part to the authentication engine corresponding to each authentication part in the authentication processing device 40. Incidentally, the authentication data generation device 10 may cut out the image of the portion of the authentication part from the taken image focused on each authentication part, and supply the image to the authentication processing device 40 as the authentication data.

As described above, the authentication processing device 40 includes a plurality of authentication engines prepared for each authentication part. Each authentication engine performs biometric authentication based on the authentication data supplied from the authentication data generation device 10. Also, the authentication processing device 40 determines and outputs the authentication result of the user based on the authentication results of the plurality of authentication engines. For example, when the authentication is successful for all the authentication parts, the authentication processing device 40 determines that the user's authentication is successful. In another example, when the authentication is successful for a predetermined number or more of the authentication parts, the authentication processing device 40 determines that the user's authentication is successful.

The authentication processing device 40 outputs the authentication result of the user to another device that uses the authentication result. As an example, when the authentication result is used for settlement, the authentication processing device 40 outputs the authentication result to the device that executes the settlement. As another example, when the authentication result is used to control the locking device of a specific space or a safe, the authentication processing device 40 outputs the authentication result to the locking device.

[Authentication Data Generation Device]

Figure 2:
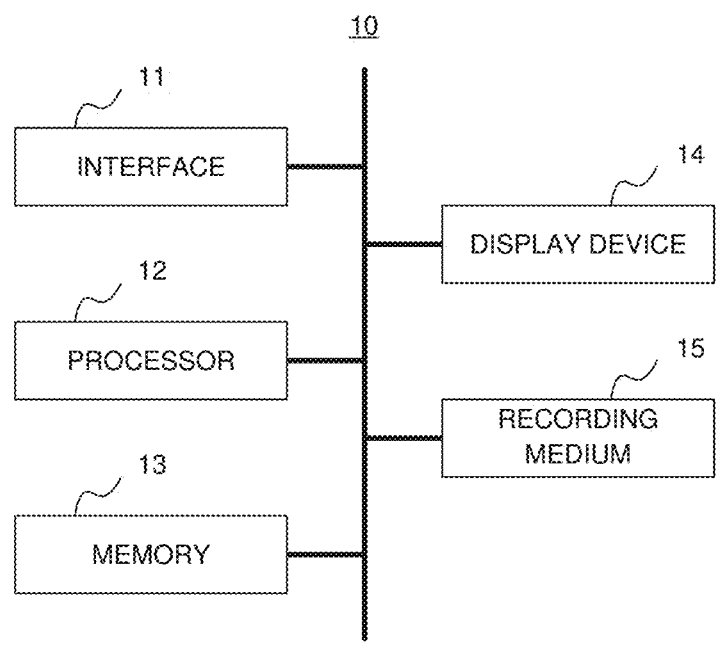
FIG. 2 is a block diagram showing a hardware configuration of an authentication data generation device.

Next, the authentication data generation device 10 will be described in detail. FIG. 2 is a block diagram illustrating a hardware configuration of the authentication data generation device 10. As illustrated, the authentication data generation device 10 includes an interface 11, a processor 12, a memory 13, a display device 14, and a recording medium 15.

The interface 11 transmits and receives data to and from the camera 2 and the authentication processing device 40. The interface 11 is used when the authentication data generation device 10 transmits the control signal relating to the image-taking to the camera 2 or receives the taken image generated by the camera 2. Also, the interface 11 is used when the authentication data generation device 10 supplies the authentication data, which is the taken image, to the authentication processing device 40.

The processor 12 is a computer such as a CPU (Central Processing Unit), and controls the entire authentication data generation device 10 by executing programs prepared in advance. The memory 13 is configured by a ROM (Read Only Memory), RAM (Random Access Memory), or the like. The memory 13 stores various programs to be executed by the processor 12. Also, the memory 13 is used as a work memory during the execution of various processing by the processor 12.

The display device 14 is typically a liquid crystal display or the like, and displays a guide image when the user performs image-taking of the authentication part. The display device 14 includes a touch panel and is also used as an input device of the image-taking instruction by a user.

The recording medium 15 is a non-volatile and non-transitory recording medium such as a disk-shaped recording medium or a semiconductor memory, and is configured to be detachable from the authentication data generation device 10. The recording medium 15 records various programs executed by the processor 12. When the authentication data generation device 10 executes various kinds of processing, a program recorded on the recording medium 15 is loaded into the memory 13 and executed by the processor 12.

FIG. 3 is a block diagram illustrating a functional configuration of the authentication data generation device 10. As illustrated, the authentication data generation device 10 includes a camera control unit 21, a part determination unit 22, an engine management unit 23, and a display control unit 24.

The camera control unit 21 transmits the control signal to the camera 2, and controls the image-taking. Specifically, the camera control unit 21 controls the settings such as exposure and focus at the time of image-taking by the camera 2, and controls the image-taking timing by giving an image-taking instruction. The camera control unit 21 is an example of an image-taking control unit of the present disclosure.

The part determination unit 22 determines the authentication part of the user to be imaged by the camera 2. The authentication part is a part of the user's body used for biometric authentication, and is a face in case of face authentication, a palm in case of palmprint authentication, and a fingertip in case of fingerprint authentication. The part determination unit 22 supplies the determined authentication part to the camera control unit 21, and the camera control unit 21 makes the camera 2 take an image focused on the authentication part determined by the part determination unit 22.

The engine management unit 23 controls the authentication engine of each authentication part in the authentication processing device 40. Specifically, the engine management unit 23 stores, in advance, information such as the type of each authentication engine prepared in the authentication processing device 40 and the condition of the authentication data (the taken images) necessary for the authentication. Then, the engine management unit 23 classifies the taken images of each authentication part generated by the camera 2 and supplies them to the corresponding authentication engine in the authentication processing device 40. For example, when a taken image focused on a user's face (hereinafter referred to as "face authentication data") and a taken image focused on the user's palm (hereinafter referred to as "palmprint authentication data") are obtained by the camera 2, the engine management unit 23 supplies the face authentication data to the face authentication engine in the authentication processing device 40 and supplies the palmprint authentication data to the palmprint authentication engine in the authentication processing device 40. The engine management section 23 is an example of an output unit of the present disclosure.

Figure 4A:
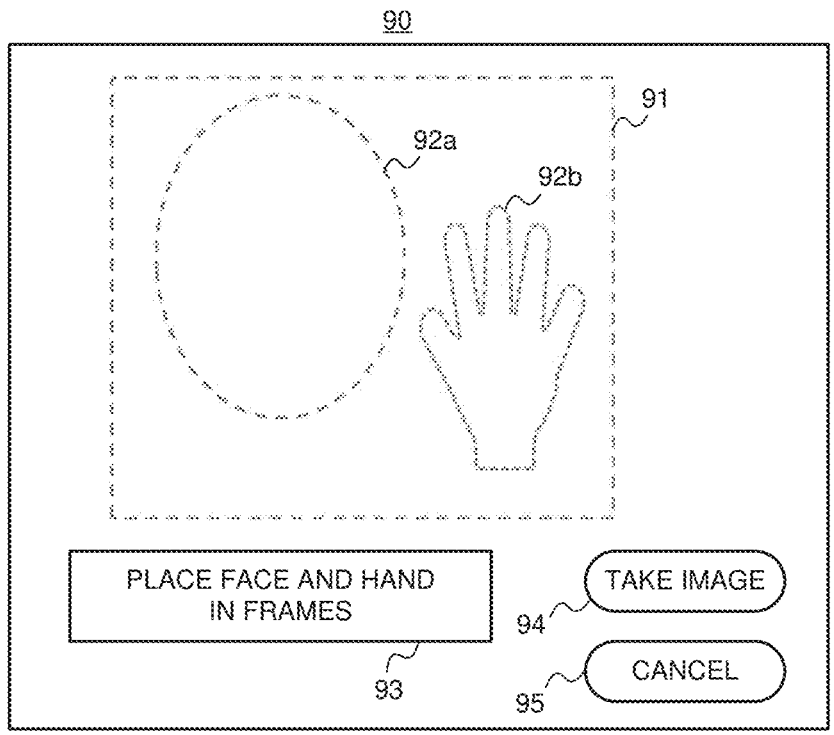
FIGS. 4A and 4B show examples of a guide images for taking images.

The display control unit 24 displays a guide image on the display device 14 when the user takes the image of the authentication part. The guide image is an image showing a position where the user should place the authentication part within the image-taking range of the camera 2. FIG. 4A shows an example of the guide image. The guide image 90 includes an image-taking area 91, a message area 93, an image-taking button 94, and a cancel button 95. The image-taking area 91 indicates a range to be imaged by the camera 2. The image-taking area 91 includes guide frames 92a, 92b. The guide frames 91a, 92b indicate positions where the user should place the authentication parts at the time of image-taking. In the example of FIG. 4A, the guide frame 92a indicates the position where the user should place the face, and the guide frame 92b indicates the position where the user should place the palm. The message area 93 is an area for displaying a message to be notified to the user regarding the image-taking. The image-taking button 94 is used by the user to instruct the image-taking. The cancel button 95 is used by the user to cancel the image-taking. Incidentally, in the authentication device of the type of performing automatic image-taking, the image-taking button 94 may be omitted. In this case, the authentication device automatically performs image-taking when the user appropriately enters the image-taking area, for example.

Figure 4B:
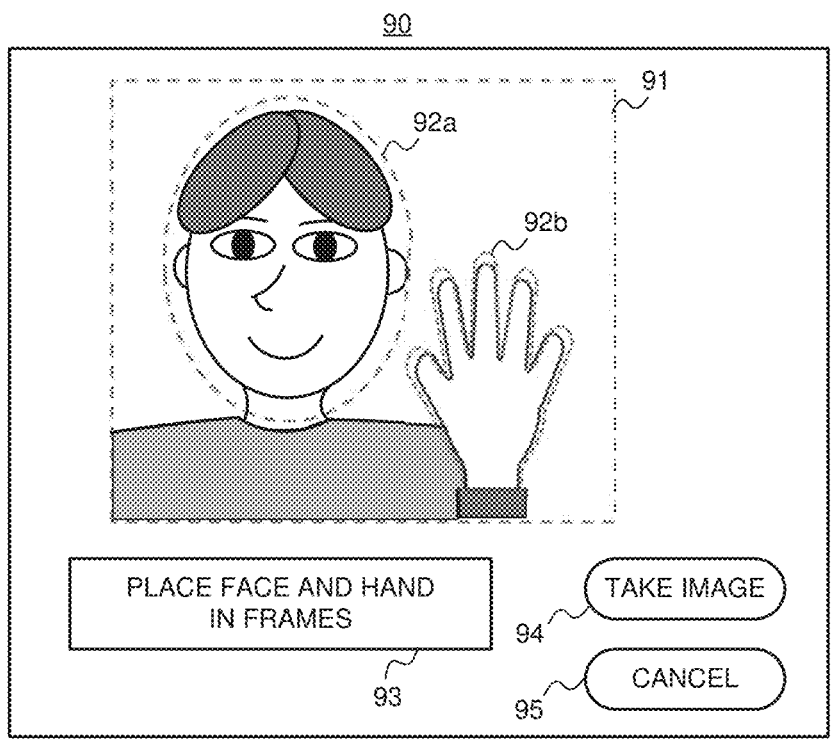
Figure 5:
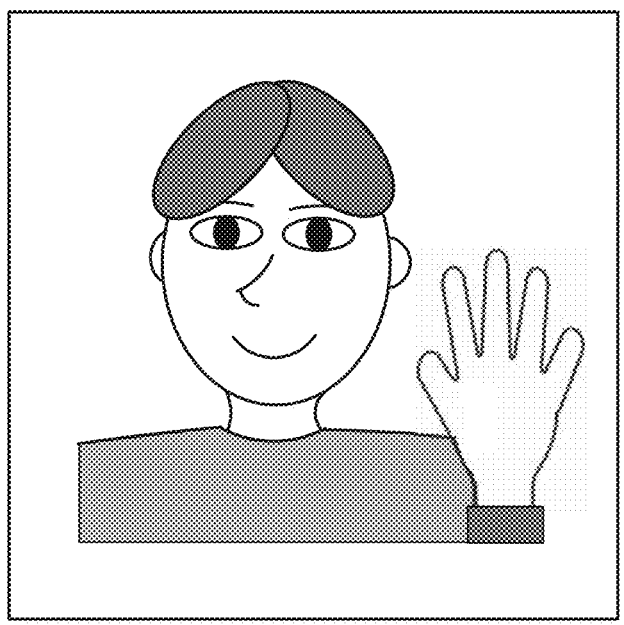
FIG. 5 shows an example of a taken image.

FIG. 4B shows the state in which the user places the authentication parts according to the guide image 90 shown in FIG. 4A. The user places the face in the guide frame 92a, and places the palm in the guide frame 92b. In this state, when the user presses the image-taking button 94, image-taking by the camera 2 is performed. FIG. 5 shows an example of the taken image by the camera 2. The image is obtained in which the user's face is at the position corresponding to the guide frame 92a and the user's palm is at a position corresponding to the guide frame 92b. Incidentally, since the image-taking area 91 and the guide frames 92a, 92b shown in FIGS. 4A and 4B are used to place the authentication parts in the guide image, they are not included in the taken image.

[Authentication Processing Device]

Next, the authentication processing device will be described in detail. The authentication processing device 40 executes the biometric authentication processing using the authentication data supplied from the authentication data generation device 10, i.e., the taken image of each authentication part.

Figure 6:
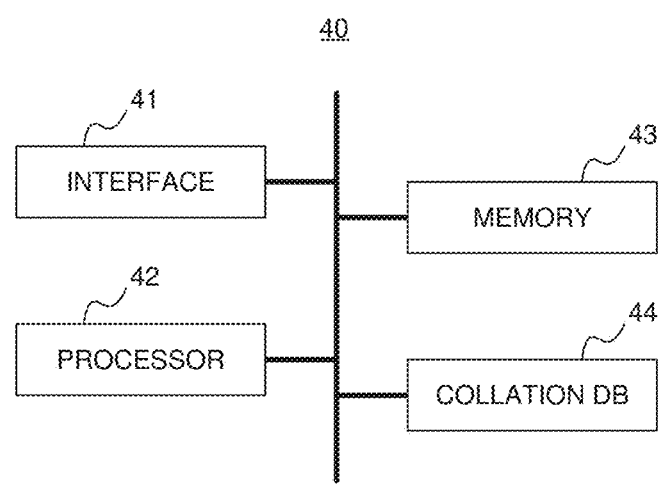
FIG. 6 is a block diagram showing a hardware configuration of the authentication processing device.

FIG. 6 is a block diagram showing a hardware configuration of the authentication processing device 40. The authentication processing device 40 includes an interface 41, a processor 42, a memory 43, and a collation database (DB) 44. The interface 41 is used for receiving the authentication data from the authentication data generation device 10 and for outputting the authentication result. The processor 42 is configured by a computer such as a CPU, and executes the authentication processing of the authentication processing device 40. Specifically, the processor 42 functions as an authentication engine by executing a program prepared in advance, and executes the authentication processing using the authentication data. The memory 43 is configured by a ROM, RAM, and the like, and stores programs executed by the processor 42. Specifically, the memory 43 stores programs corresponding to a plurality of authentication engines. Also, the memory 43 is used as a work memory when the processor 42 performs the authentication processing. The collation DB 44 stores collation data registered in advance for each user. The collation data is, for example, the data of feature points in the taken image of the authentication part.

Figure 7:
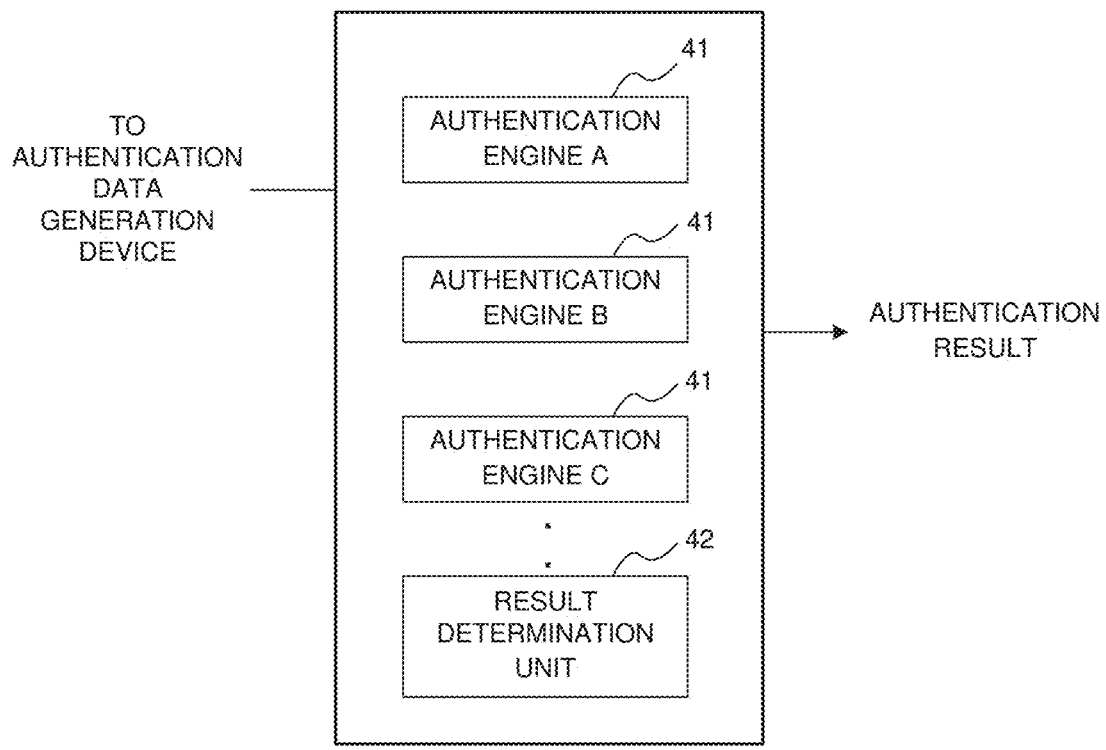
FIG. 7 is a block diagram showing a functional configuration of the authentication processing device.

FIG. 7 is a block diagram showing a functional configuration of the authentication processing device 40. The authentication processing device 40 functionally includes a plurality of authentication engines 41, and a result determination unit 42. Each of the authentication engines 41 performs biometric authentication using different authentication parts. For example, the authentication engine A may be a face authentication engine, the authentication engine B may be a palmprint authentication engine, and the authentication engine C may be a fingerprint authentication engine. Each of the authentication engines 41 executes authentication processing by collating the authentication data supplied from the authentication data generation device 10 with the collation data stored in the collation DB 44, and outputs the authentication result.

The result determination unit 42 determines the authentication result of the user as a whole according to a predetermined determination criterion based on the authentication result of each authentication engine 41. As an example, if there is such a determination criterion that the authentication of the user becomes successful when the determination results of two or more authentication engines are successful, the result determination unit 42 determines that the authentication of the user is successful when the determination results of two or more authentication engines 41 are successful. As another example, if there is such a determination criterion that the authentication of the user becomes successful only when the determination results of all the authentication engines are successful, the result determination unit 42 determines that the authentication of the user is successful only when the determination results of all the authentication engines 41 are successful. The result determination unit 42 outputs the authentication result thus obtained to the device that uses the authentication result. Thus, in the present example embodiment, by combining multiple authentications, it is possible to perform high-speed and high-accuracy authentication.

[Authentication Data Generation Processing]

Next, the authentication data generation processing executed by the authentication data generation device 10 will be described in detail.

First Example

Figure 8:
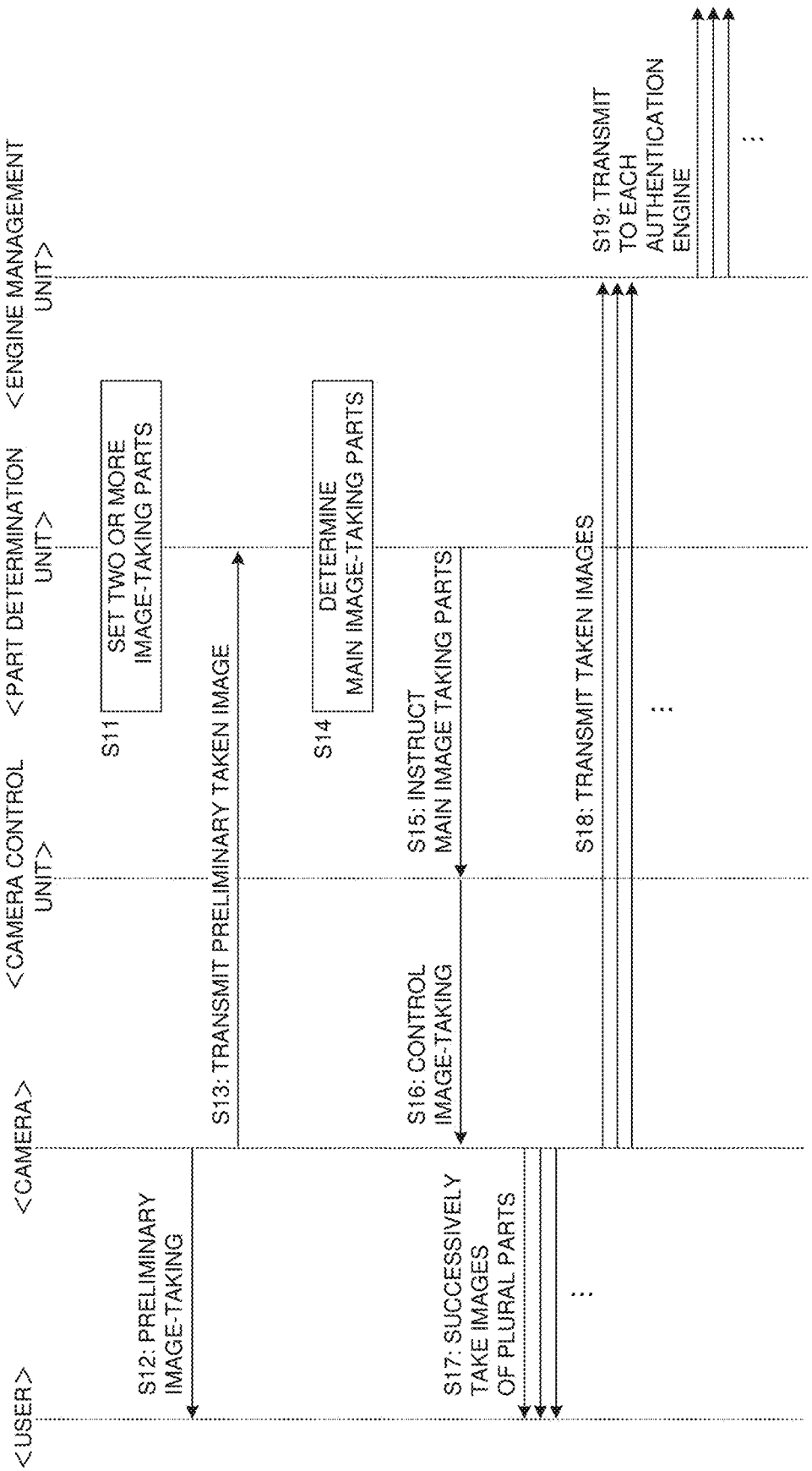
FIG. 8 is a sequence diagram of a first example of authentication data generation processing.

First, a first example of the authentication data generation processing will be described. FIG. 8 is a sequence diagram of the first example of the authentication data generation processing. First, as a pre-processing, the part determination unit 22 sets two or more image-taking parts (step S11). The image-taking parts are determined by various methods. In one method, fixed image-taking parts are set to the authentication data generation device 10. In the authentication processing device 40, since the authentication processing is executed by the authentication engines prepared in advance, the authentication parts corresponding to the authentication engines prepared in the authentication processing device 40 in advance are set as the image-taking parts. In another method, two or more authentication parts designated by the user from among multiple authentication parts for which the authentication engines are prepared are set as the image-taking parts. In this case, a list of available authentication parts is displayed on the display device 14, and the user is requested to select the image-taking parts in advance.

When the user moves to the image-taking range of the camera 2 and makes an image-taking instruction, the camera 2 performs preliminary image-taking (step S12). The preliminary image-taking is a process of taking a preliminary taken image to be used to determine the authentication parts that will be imaged later as the authentication data.

In the following, taking the image used as the authentication data after the preliminary image-taking will be referred to as "main image-taking," thereby distinguishing the main image-taking from the preliminary image-taking. The camera 2 transmits the preliminary taken image generated by the preliminary image-taking to the part determination unit 22 (step S13). The part determination unit 22 determines, from among the two or more image-taking parts set in step S11, the image-taking parts included in the preliminary taken image as the authentication parts to be imaged (also referred to as "main image-taking part") (step S14), and instructs the camera control unit 21 to take the images of the main image-taking parts (step S15).

The camera control unit 21 controls the camera 2 to perform image-taking of the main image-taking parts instructed by the part determination unit 22 (step S16). At this time, the camera control unit 21 controls the camera 2 to generate images focused on each of the two or more of the main image-taking parts. For example, when a face and a palm are used as the main image-taking parts as in the example of FIG. 4, the camera control unit 21 controls the camera 2 to take the image focused on the user's face and the image focused on the user's palm, and the camera 2 successively take the images of a plurality of main image-taking parts (step S17). Specifically, the camera 2 repeats the operation of focusing on each of the image-taking parts and taking the image. In the above example, the camera 2 performs image-taking by focusing on the user's face, and immediately performs image-taking by focusing on the user's palm. At this time, the camera 2 completes the successive image-taking in the shortest possible time so that the user does not need to maintain the same pose for a long time. Specifically, it is preferable that the camera 2 completes the image-taking of all the main image-taking parts within a few seconds (2 to 3 seconds). Thus, in view of the user's experience, the authentication can be performed in one image-taking. Therefore, the burden on the user can be reduced and the time required for the authentication can be shortened.

When the main image-taking is completed, the camera 2 transmits the taken images of the plurality of main image-taking parts to the engine management unit 23 (step S18). The engine management unit 23 classifies the received images for each authentication engine, and supplies them to the respective authentication engines in the authentication processing device 40 (step S19). In the above example, the engine management unit 23 supplies the image of the user's face to the face authentication engine, and supplies the image of the user's palm to the palmprint authentication engine. Thus, the authentication data generation processing ends.

As described above, in the authentication data generation processing, it is possible to take images of a plurality of authentication parts of biometric authentication in a short time. Therefore, when performing the biometric authentication of two or more factors, it is not necessary for the user to perform multiple image-taking or change the pose, and thereby the burden on the user can be reduced. Further, since it is possible to obtain the image focused on each authentication part as the authentication data in the successive image-taking in a short time, the authentication can be accurately performed by each authentication engine.

Second Example

Next, a second example of the authentication data generation processing will be described. In the above-described first example, the part determination unit 22 sets two or more image-taking parts in advance, and determines the image-taking parts included in the preliminary taken image as the main image-taking parts. Instead, in the second example, the part determination unit 22 extracts a plurality of authentication parts from the preliminary taken image, and determines them as the main image-taking parts.

Figure 9:
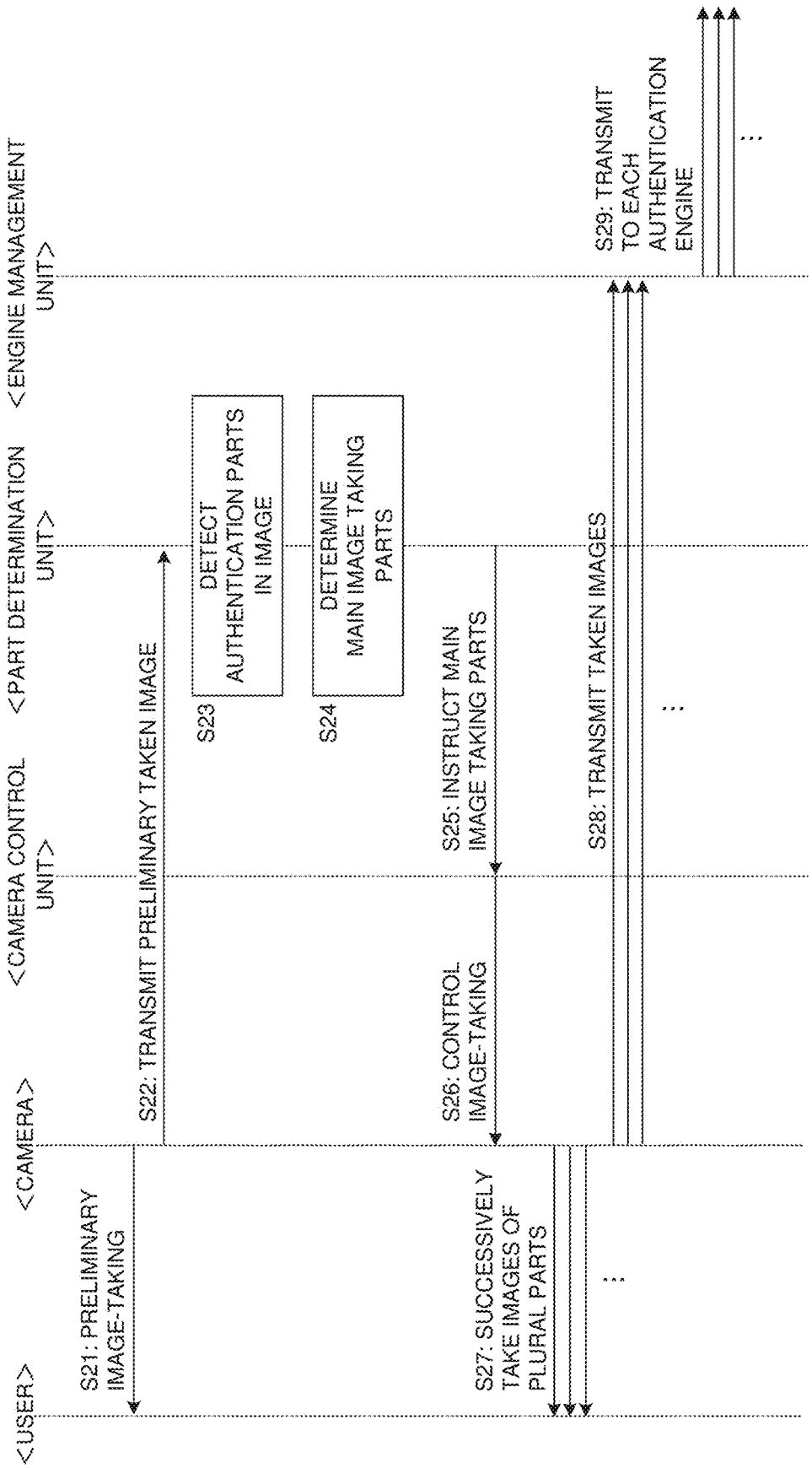
FIG. 9 is a sequence diagram of a second example of authentication data generation processing.

FIG. 9 is a sequence diagram of the second example of authentication data generation processing. In this example, the processing corresponding to step S11 of the first example is not executed. Therefore, the preliminary image-taking by the camera 2 is performed first (step S21), and the preliminary taken image is transmitted to the part determination unit 22 (step S22). Next, the part determination unit 22 detects the authentication parts included in the preliminary taken image (step S23), and determines the main image-taking parts from among them (step S24). As an example, the part determination unit 22 may determine all the authentication parts included in the preliminary taken image as the main image-taking parts. As another example, when it is determined that the authentication processing device 40 executes the authentication processing using a predetermined number of the authentication parts (e.g., two factors), the part determination unit 22 determines the predetermined number of the authentication parts from among the plurality of authentication parts included in the preliminary taken image as the main image-taking parts. For example, even when three authentication parts are included in the preliminary taken image, the part determination unit 22 may determine only two of the authentication parts as the main authentication parts. Further, in this case, the part determination unit 22 may analyze the preliminary taken image and determine, from among the plurality of authentication parts, a predetermined number of authentication parts whose image-taking state (e.g., size, brightness, sharpness, or the like in the image) are good as the main authentication parts. For example, when the user's face, palm, and finger are included in the preliminary taken image, but the portion of the finger is small and unclear, the part determination unit 22 may determine the user's face and palm as the main image-taking parts.

When the main image-taking parts are determined in step S24, the subsequent processing is the same as the first example. That is, the processing of steps S25 to S29 is the same as the processing of steps S15 to S19 of the first example shown in FIG. 8. Therefore, the description thereof will be omitted.

As described above, according to the second example of the authentication data generation processing, since the image-taking parts are determined from among the authentication parts included in the preliminary taken image, the user can designate the authentication parts that the user desires in the preliminary image-taking. For example, when the user desires the face authentication and the palmprint authentication, the user may perform the preliminary image-taking with such a pose that the face and palm are included in the taken image. Also, when the user desires the face authentication and the fingerprint authentication, the user may perform the preliminary image-taking with such a pose that the face and the tip of the thumb are imaged.

OTHER EXAMPLES

In the first and second examples described above, the preliminary image-taking is performed first, and the main image-taking parts are determined based on the preliminary taken image. However, if the preliminary taken image can be used as the main image for any of the main image-taking parts, the main image-taking may be performed for taking the image of the parts other than that main image-taking part. For example, it is considered that the biometric authentication of three factors, i.e., the face, the palmprint, and the fingerprint is performed. In the first and second examples described above, after performing the preliminary image-taking, the main image-taking for those three authentication parts will be performed. However, when the preliminary taken image obtained by the preliminary image-taking is focused on the user's face and the preliminary taken image can be used as the authentication data of the face authentication as it is, the image-taking focused on the user's face is not necessary in the main image-taking, and only the image-taking focused on the user's palm and thumb (fingerprint) can be performed. As a specific processing, the part determination unit 22 analyzes the preliminary taken image, and when it is determined that the preliminary taken image is sufficiently focused on any of the main image-taking parts, the part determination unit 22 gives the image-taking instruction for other main image-taking parts to the camera control unit 21. Further, the part determination unit 22 supplies the preliminary taken image to the engine management section 23 as an image for one of the main image-taking parts. This makes it possible to use the preliminary image-taking effectively and to complete the image-taking in a shorter time.

[Authentication Processing]

Next, authentication processing executed by the authentication processing device 40 will be described. The authentication processing device 40 receives the authentication data generated by the authentication data generation processing from the authentication data generation device 10, and performs authentication by the authentication engines 41. Then, the result determination unit 42 determines the authentication result of the user based on the authentication result of each authentication engine 41. For example, when the authentication results are successful for all the authentication parts, the result determination unit 42 determines that the authentication of the user is successful. Then, the result determination unit 42 transmits the authentication result of the user obtained by the determination to the external device. Thus, a high-accuracy authentication result is obtained by combining biometric authentication of multiple factors.

EXAMPLE

Figure 10:
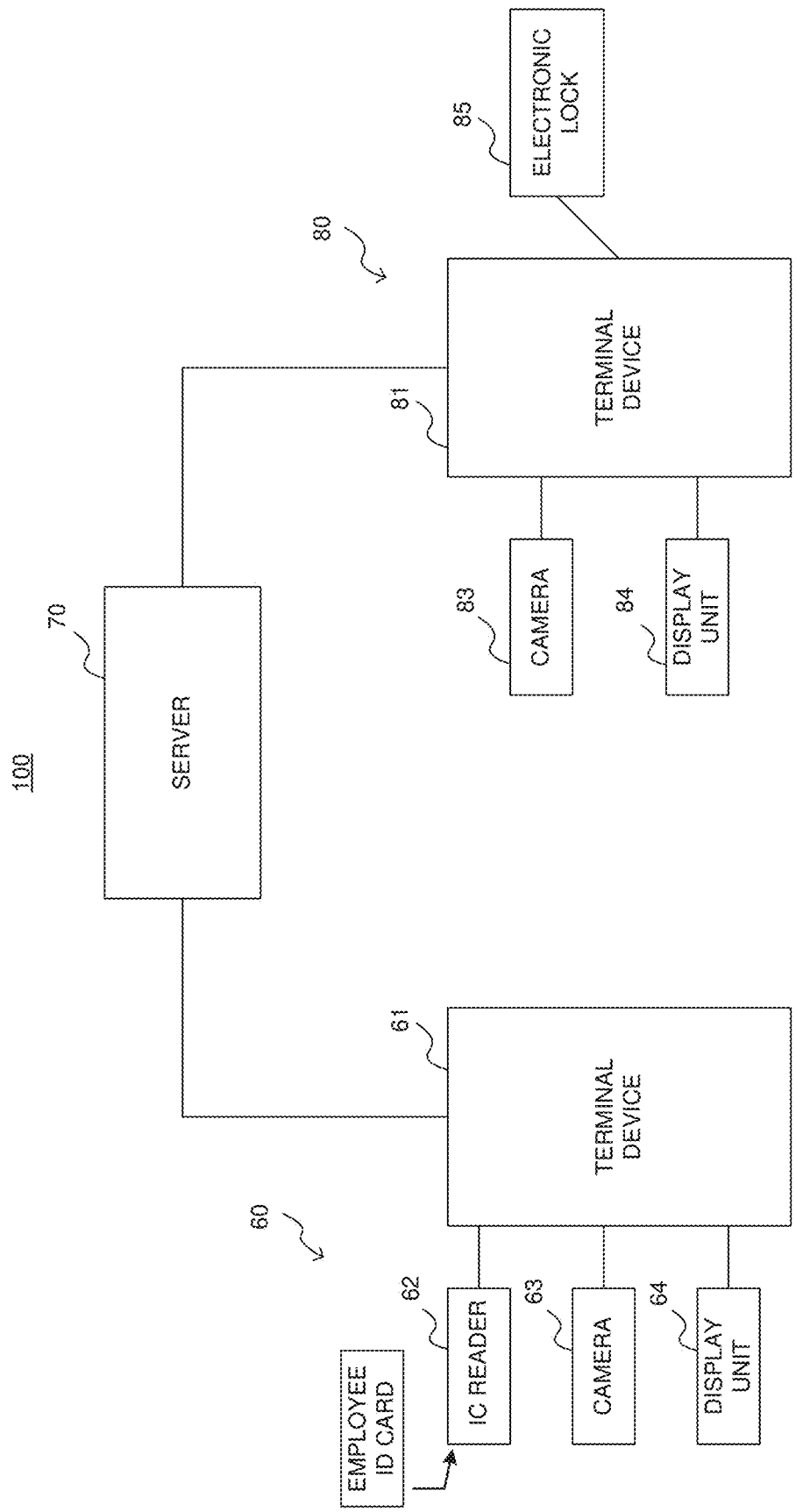
FIG. 10 is a block diagram showing a schematic configuration of an authentication system according to an example.

Next, a description will be given of an example to which the above-described authentication device is applied. FIG. 10 is a block diagram showing a schematic configuration of an authentication system 100 according to the example. The authentication system 100 is a system in which a user who is an employee of a certain company unlocks an electronic lock by biometric authentication. For example, by applying this electronic lock to a door of a specific room or a conference room, it can be used for the entry and exit management of employees. In addition, by applying this electronic lock to a specific file shelf or the like, it is possible to perform access management to confidential information or the like. As shown in FIG. 10, the authentication system 100 includes a registration device 60 and an authentication device 80 connected to the server 70 by an in-house LAN or the like.

First, a description will be given of the registration device 60. The registration device 60 is used when the user makes registration of the biometric authentication, and includes a terminal device 61, an IC reader 62, a camera 63, and a display unit 64. The terminal device 61 is typically constituted by a PC (Personal Computer) or the like. The IC reader 62 reads the user's IDM (Identity Management) information from an employee ID card that is an IC card. The camera 63 takes images of user's authentication parts. In this example, the authentication system 100 performs the two-factor authentication by the face authentication and the palmprint authentication of the user. Thus, the camera 63 takes the image including the user's face and palm. The display unit 64 displays a guide image illustrated in FIG. 4A, and receives the image-taking instruction or the like by the user.

Figure 11:
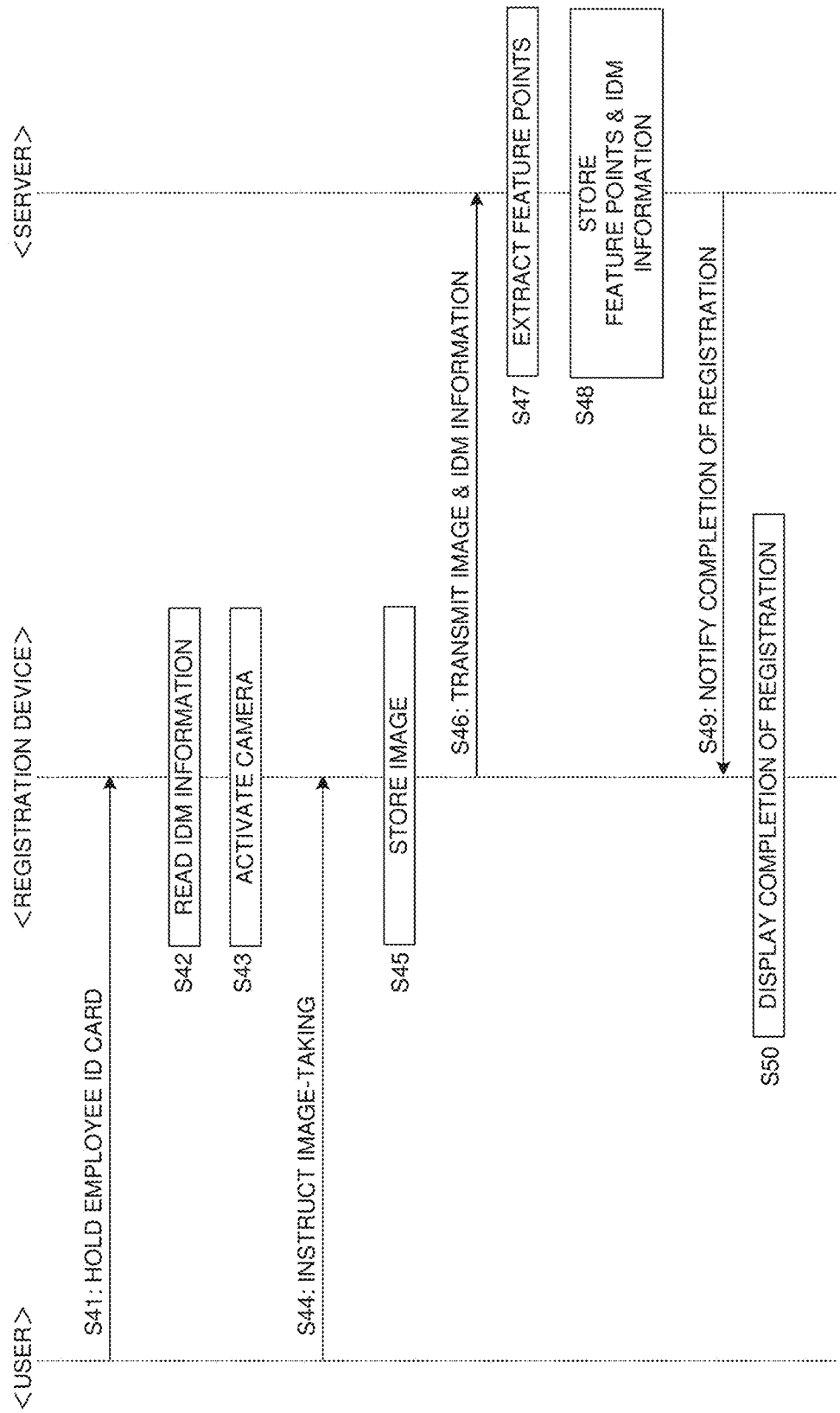
FIG. 11 is a sequence diagram of registration processing of the authentication system according to the example.

FIG. 11 is a sequence diagram showing registration processing of the authentication system according to the example. This processing is executed by the registration device 60. First, the user starts the registration processing by pressing the registration button in the guide image displayed on the display unit 64, and holds his or her employee ID card over the IC reader 62 (step S41). The registration device 60 reads the IDM information from the employee ID card by the IC reader 62 (step S42), and activates the camera 63 (step S43). When the camera 63 is activated, the guide image is displayed on the display unit 64. When the user operates the guide image to input an image-taking instruction (step S44), the image-taking by the camera 63 is performed, and the registration device 60 stores the taken image (step S45). Incidentally, the image-taking in this case may be performed by the method of successively taking the image including the user's face and the image including the user's palm in the same manner as in the above-described example embodiment, or may be performed by the method of taking the image of the face and the image of the palm individually in an usual manner.

Next, the registration device 60 transmits the IDM information of the user and the taken image to the server 70 (step S46). The server 70 extracts feature points from the taken image using authentication engines prepared in advance (step S47), and stores the information of the extracted feature points and the IDM information in a database in association with each other (step S48). Thus, the feature point information for the face authentication and palmprint authentication of the user is stored in the server 70 in association with the IDM information, and registration of the user is completed. The server 70 transmits the registration completion notification to the registration device 60 (step S49). The registration device 60 performs registration completion display including a message indicating the completion of the registration on the display unit 64 (step S50). Thus, the registration processing of the user ends.

Next, the authentication device 80 will be described. The authentication device 80 uses the feature point information of the user registered in the server to authenticate the user, and unlocks the electronic lock 85. Namely, the authentication device 80 corresponds to the authentication device 1 shown in FIG. 1, and controls the electronic lock using the authentication result. As shown in FIG. 10, the authentication device 80 includes a terminal device 81, a camera 83, a display unit 84, and an electronic lock 85. The terminal device 81 is constituted by a PC or the like. The terminal device 81 includes a function of the authentication data generation device 10 and the authentication processing device 40 shown in FIG. 1, and basically performs the same processing as the authentication device 1 described above. The camera 83 takes the images of the user's authentication parts to generate taken images. The display unit 84 displays a guide image or the like as shown in FIG. 4A, and receives the image-taking instruction by the user.

Figure 12:
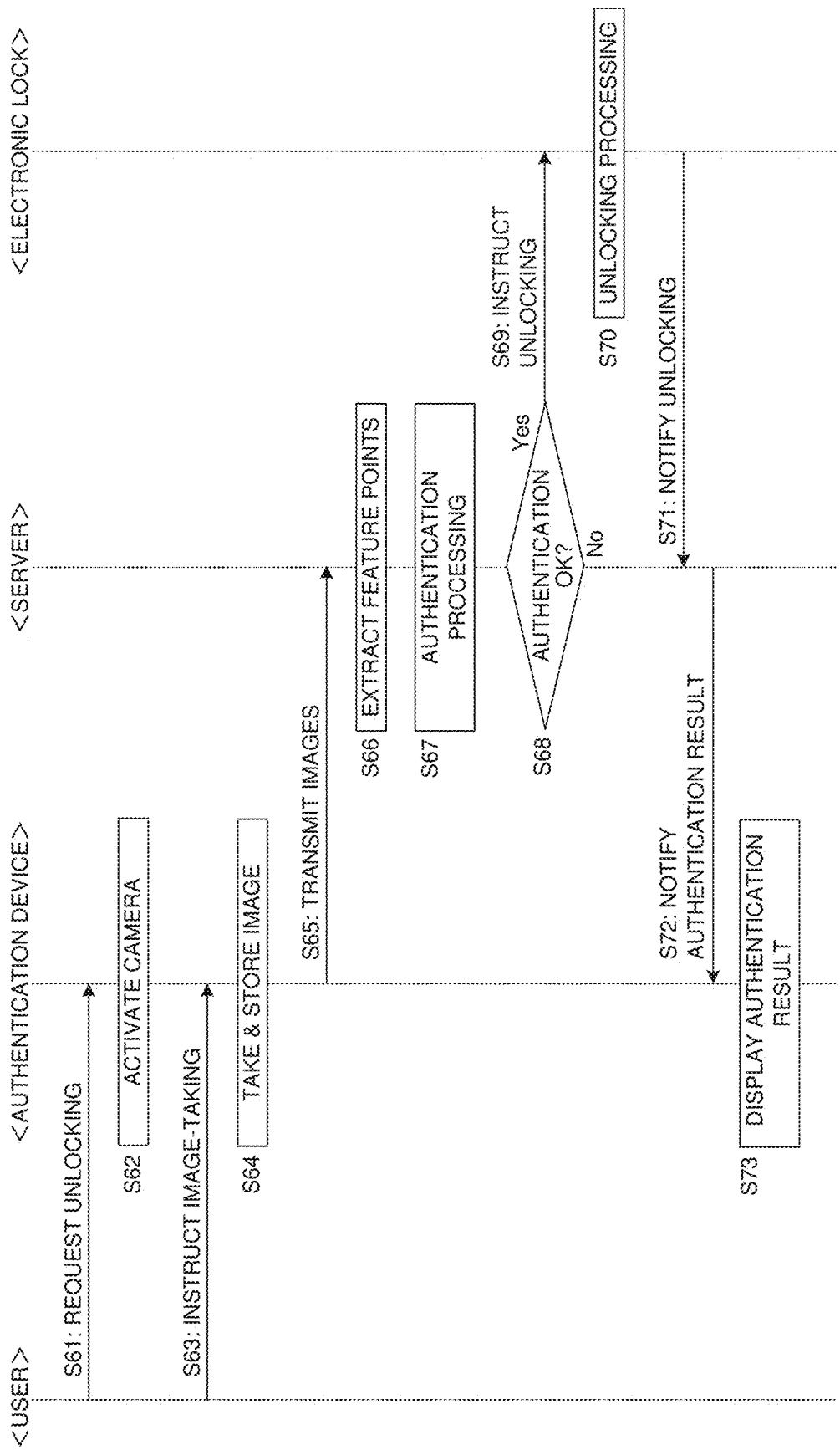
FIG. 12 is a sequence diagram of authentication processing of the authentication system according to the example.

FIG. 12 is a sequence diagram of the authentication processing of the authentication system according to the example. This processing is executed by the authentication device 80. When the user makes the unlock request by pressing the unlock button in the guide image displayed on the display unit 84 (step S61), the authentication device 80 activates the camera 83 (step S62). Next, when the user makes the image-taking instruction by operating the guide image (step S63), the camera 83 takes the images, and the authentication device 80 stores the taken images (step S64). Incidentally, the image-taking in this case is performed by a method of successively taking the image including the user's face and the image including the user's palm in a short time in the same manner as the authentication data generation device 10 in the above-described example embodiment.

Next, the authentication device 80 transmits the taken images of the user to the server 70 (step S65). The server 70 extracts the feature points from the taken images using the authentication engines or the like (step S66), and executes the authentication processing by collating the feature points with the authentication information registered in advance in the database (step S67). Similar to the authentication processing device 40 in the above-described example embodiment, this authentication processing is executed by combining the face authentication and the palmprint authentication. When the authentication is successful (step S68: Yes), the server 70 transmits the unlocking instruction to the electronic lock 85 (step S69). Upon receiving the unlocking instruction, the electronic lock 85 executes unlocking processing (step S70), and transmits the unlocking notification to the server 70 (step S71). On the other hand, when the authentication is failed (step S68: No), the server 70 does not transmit the unlocking instruction to the electronic lock 85.

Then, the server 70 notifies the authentication device 80 of the authentication result. If authentication is successful in step S68, the server 70 notifies the authentication device 80 of the authentication result indicating that the authentication was successful and the electronic lock 85 was unlocked. On the other hand, if the authentication is failed in step S68, the server 70 notifies the authentication device 80 of the authentication result indicating that the authentication was failed. When receiving the notification of the authentication result, the authentication device 80 displays the contents on the display unit 84 to notify the contents the user. Then, the authentication processing ends. When the authentication is failed, the server 70 may permit retries only a predetermined number of times or prohibit retries within a predetermined time.

In the example shown in FIG. 10, for convenience of explanation, the registration device 60 and the authentication device 80 are configured separately. However, in practice, a single PC may be provided with both the registration function and the authentication function. In this case, it is sufficient to connect an IC reader, a camera, a display unit, and an electronic lock to one PC. Also, while the terminal device 81 of the authentication device 80 controls the electronic lock 80 in the example of FIG. 10, the server 70 may directly control the electronic lock 85.

Although the authentication result by the authentication system 100 is used for unlocking the electronic lock 85 in the above example, the authentication result may be used for other applications. For example, the authentication result can be used for settlement. In this case, if the settlement information such as credit card information is registered in advance instead of the IDM information read from the employee ID card, a system for performing the settlement by using the biometric authentication of the face and palmprint can be configured.

MODIFIED EXAMPLES

Although the authentication data generation device 10 includes the display device 14 in the above example embodiment and the example, the application of the present disclosure is not limited thereto. For example, in a non-aggressive authentication system in which the authentication is performed while the user is not particularly conscious, or a system using an image-taking device of full autofocus, there is a case where a display device for giving instructions to the user is not necessary.

Although the above example embodiment and the example implement the multiple authentications using the face authentication and the palmprint authentication, the application of the present disclosure is not limited thereto, and other authentication factors can be combined. For example, other than the face authentication and the palmprint authentication, iris authentication, fingerprint authentication and vein authentication using a finger, authentication using the shape of the ear, authentication using the expression of the face registered in advance or gesture using the hand, and the like may be used in combination. Moreover, although these authentications basically use still images, authentication using the gait of the user may be performed using video instead. For example, video of the user may be taken by a camera in front of the user, and the gait authentication may be combined with the face authentication. In addition, although biometric authentication is utilized in the above-described example embodiment and the example, it is possible to utilize authentication using a code to be displayed on an body or a specific object (such as a small device).

[Various Device Configurations]

The authentication device 1 shown in FIG. 1 can be applied to various devices and systems. In one example, as in the example shown in FIG. 10, the authentication data generation device 10 may be configured as a terminal device such as a PC, and the authentication processing device 40 may be configured as a server. In this case, the authentication data is transmitted between the terminal device and the server. In another example, the functions of the authentication data processing device 10 and the authentication processing device 40 may be provided in one terminal device such as a PC, and may be configured as a stand-alone device. In this case, a camera is connected to the terminal device, and the images may be taken by controlling the camera 2 from the terminal device. As yet another example, a smartphone or a tablet PC may be used as an integrated device including the camera 2, the authentication data generation device 10, and the authentication processing device 40. Further, the functions of the authentication data generation device 10 and the authentication processing device 40 may be incorporated in the camera 2 to form a camera with an authentication function.

2. Second Example Embodiment

Figure 13:
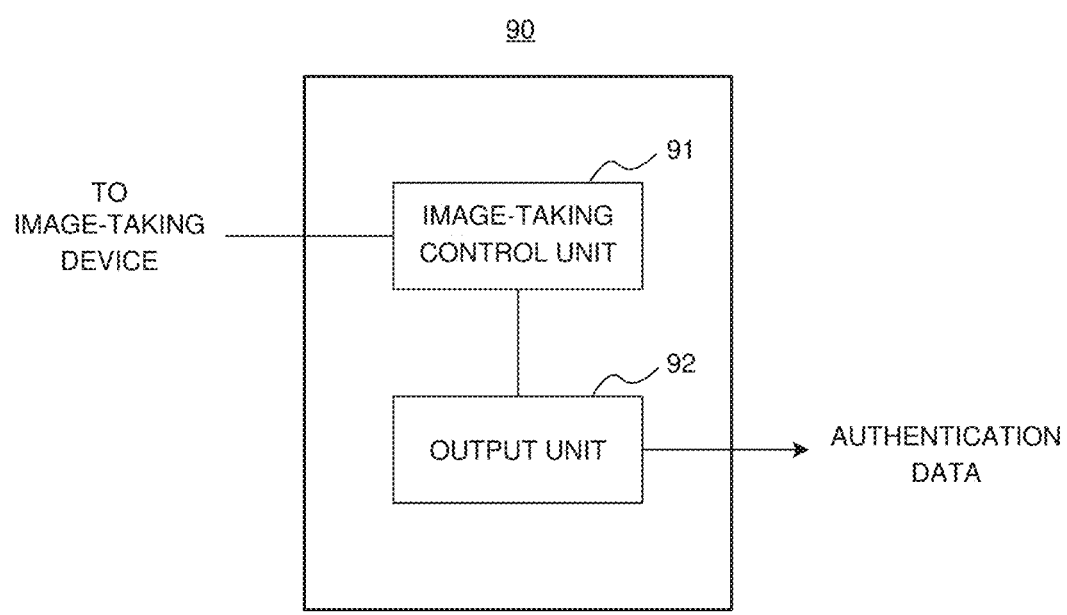
FIG. 13 is a block diagram showing a functional configuration of an authentication data generation device according to a second example embodiment.

Next, a second example embodiment of the present disclosure will be described. FIG. 13 shows a functional configuration of an authentication data generation device 90 according to the second example embodiment. The authentication data generation device 90 includes an image-taking control unit 91, and an output unit 92. The image-taking control unit 91 controls one image-taking device such as a camera to image a plurality of authentication parts of the authentication target person with different settings. The output unit 92 outputs the images of a plurality of authentication parts obtained by the image-taking, as the authentication data for each authentication part. Typically, the output unit 92 outputs the authentication data to a device that executes authentication processing. Thus, since the authentication data generation device 90 generates the images of a plurality of authentication parts of the authentication target person using one image-taking device, it is possible to perform high-accuracy authentication without the burden of the user.

Incidentally, the authentication data generation device 90 according to the second example embodiment can also be applied to various devices and systems. For example, the authentication data generation device 90 may be configured as a terminal device such as a PC to create a system for communicating with the server, or an authentication processing function may be added to the authentication data generation device 90 to form a stand-alone device. Further, the authentication data generation device 90 may be integrated with the image-taking device and the authentication device to form a device such as a smartphone, a tablet PC, or a camera.

According to the present disclosure, it is possible to acquire information of a plurality of factors with a simple configuration and without burdening the user.

A part or all of the example embodiments described above may also be described as the following supplementary notes, but not limited thereto.

(Supplementary Note 1)

An authentication data generation device comprising:

an image-taking control unit configured to control a single image-taking device to take images of a plurality of authentication parts of the authentication target person with different settings; and an output unit configured to output taken images of the plurality of authentication parts obtained by the image-taking as authentication data for the authentication parts.

(Supplementary Note 2)

The authentication data generation device according to supplementary note 1, wherein the image-taking control unit performs a preliminary image-taking of the authentication target person, and determines the plurality of authentication parts subjected to the image-taking by analyzing the preliminary taken image obtained by the preliminary image-taking.

(Supplementary Note 3)

The authentication data generation device according to supplementary note 2, wherein the image-taking control unit determines a certain number of the plurality authentication parts included in the preliminary taken image as the plurality of authentication parts subjected to the image-taking.

(Supplementary Note 4)

The authentication data generation device according to supplementary note 2, wherein the image-taking control unit determines all the plurality authentication parts included in the preliminary taken image as the plurality of authentication parts subjected to the image-taking.

(Supplementary Note 5)

The authentication data generation device according to any one of supplementary notes 1 to 4, wherein the image-taking control unit controls the image-taking device to adjust focusing of the image-taking device for each of the plurality of authentication parts and take an image focused on each authentication part.

(Supplementary Note 6)

The authentication data generation device according to any one of supplementary notes 1 to 5, wherein the plurality of authentication parts includes a face of the authentication target person, and a palm or finger of the authentication target person.

(Supplementary Note 7)

The authentication data generation device according to any one of supplementary notes 1 to 6, further comprising a display control unit configured to display, on a display device, a guide image indicating positions where the plurality of authentication parts to be placed, the positions being apart with a predetermined distance.

(Supplementary Note 8)

An authentication device comprising:

the authentication data generation device according to any one of supplementary notes 1 to 7; and an authentication processing device configured to perform authentication of the authentication target person using the authentication data for each authentication part, wherein the authentication processing device determines that the authentication of the target person is successful when the authentication for all of the plurality of authentication parts is successful.

(Supplementary Note 9)

An authentication data generating method comprising:

controlling a single image-taking device to take images of a plurality of authentication parts of the authentication target person with different settings; and outputting taken images of the plurality of authentication parts obtained by the image-taking as authentication data for the authentication parts.

(Supplementary Note 10)

A recording medium recording a program for causing a computer to execute processing of:

controlling a single image-taking device to take images of a plurality of authentication parts of the authentication target person with different settings; and outputting taken images of the plurality of authentication parts obtained by the image-taking as authentication data for the authentication parts.

While the present invention has been described with reference to the embodiments, the present invention is not limited to the above example embodiments. Various changes that can be understood by those skilled in the art within the scope of the present invention can be made in the configuration and details of the present invention. In other words, it is needless to say that the present invention includes various modifications and alterations that could be made by a person skilled in the art according to the entire disclosure, including the scope of the claims, and the technical philosophy. In addition, each disclosure of the above-mentioned patent documents cited shall be incorporated with reference to this document.

This application is based upon and claims the benefit of priority from Japanese Patent Application 2019-085095, filed on Apr. 26, 2019, the disclosure of which is incorporated herein in its entirety by reference.

DESCRIPTION OF SYMBOLS

1 Authentication device
10, 90 Authentication data generation device
21 Camera control unit
22 Part determination unit
23 Engine management unit
24 Display control unit
40 Authentication processing unit
41 Authentication engine
42 Result determination unit
60 Registration device
70 Server
80 Authentication device
100 Authentication system

What is claimed is:

1. An authentication data generation device comprising:
a memory storing instructions; and
one or more processors configured to execute the instructions to:
display, on a display device, a guide image indicating positions where a first part and a second part of an authentication target person are to be placed;
receive a preliminary taken image including the first part and the second part of the authentication target person, wherein the first part includes a face of the authentication target person and the second part includes biometric information of the authentication target person that is different from the first part;
determine, based on the preliminary taken image, which of the first part and the second part of the authentication target person is in focus;
control, in a case where the first part is in focus, an image-taking device to take an image of the second part of the authentication target person in focus;
control, in a case where the second part is in focus, the image-taking device to take an image of the first part of the authentication target person in focus; and
output the preliminary taken image and the image of the first part or the second part.

2. The authentication data generation device according to claim 1, wherein the second part of the authentication target person includes a palm or finger of the authentication target person.

3. The authentication data generation device according to claim 1, wherein the positions in the guide image where the first part and the second part are to be placed are apart by a predetermined distance.

4. An authentication device comprising:
the authentication data generation device according to claim 1; and
an authentication processing device comprising:
an additional memory storing additional instructions; and
one or more additional processors configured to execute the additional instructions to:
perform authentication of the authentication target person using authentication data for each of the first part and the second part,
wherein the one or more additional processors are configured to determine that the authentication of the authentication target person is successful when the authentication is successful for both the first part and the second part.

5. An authentication data generating method comprising:
displaying, by a processor and on a display device, a guide image indicating positions where a first part and a second part of an authentication target person are to be placed;
receiving, by the processor, a preliminary taken image including the first part and the second part of the authentication target person, wherein the first part includes a face of the authentication target person and the second part includes biometric information of the authentication target person that is different from the first part;
determining, by the processor and based on the preliminary taken image, which of the first part and the second part of the authentication target person is in focus;
controlling, by the processor and in a case where the first part is in focus, in a case where the preliminary taken image is determined so as for the first part to be in focus, an image-taking device to take an image of the second part of the authentication target person in focus;
controlling, by the processor and in a case where the second part is in focus, the image-taking device to take an image of the first part of the authentication target person in focus; and
outputting, by the processor, the preliminary taken image and the image of the first part or the second part.

6. A non-transitory computer-readable recording medium storing a program executable by a computer to:
display, on a display device, a guide image indicating positions where a first part and a second part of an authentication target person are to be placed;
receive a preliminary taken image including the first part and the second part of the authentication target person, wherein the first part includes a face of the authentication target person and the second part includes biometric information of the authentication target person that is different from the first part;
determine, based on the preliminary taken image, which of the first part and the second part of the authentication target person is in focus;
control, in a case where the first part is in focus, an image-taking device to take an image of the second part of the authentication target person in focus;
control, in a case where the second part is in focus, the image-taking device to take an image of the first part of the authentication target person in focus; and
output the preliminary taken image and the image of the first part or the second part.

7. The authentication data generation device according to claim 1,
wherein the one or more processors display, on the display device, a list of a plurality of authentication parts,
wherein the one or more processors determines the second authentication part that is selected by a user, and
wherein the preliminary taken image includes the first authentication part that is the face and includes the second authentication part that is selected by the user.

* * * * *